(12) United States Patent
Simbeck

(10) Patent No.: US 12,431,278 B2
(45) Date of Patent: Sep. 30, 2025

(54) PRINTED CIRCUIT BOARD INTEGRATED RESONANCE CAPABILITY FOR PLANAR TRANSFORMERS

(71) Applicant: Raytheon Company, Waltham, MA (US)

(72) Inventor: Sara Lorene Simbeck, Framingham, MA (US)

(73) Assignee: Raytheon Company, Arlington, VA (US)

( * ) Notice: Subject to any disclaimer, the term of this patent is extended or adjusted under 35 U.S.C. 154(b) by 1040 days.

(21) Appl. No.: 17/375,494

(22) Filed: Jul. 14, 2021

(65) Prior Publication Data

US 2023/0017174 A1    Jan. 19, 2023

(51) Int. Cl.
*H01F 27/24* (2006.01)
*H01F 27/28* (2006.01)

(52) U.S. Cl.
CPC ......... *H01F 27/2804* (2013.01); *H01F 27/24* (2013.01); *H01F 2027/2809* (2013.01)

(58) Field of Classification Search
CPC .......... H01F 27/2804; H01F 27/24; H01F 2027/2809; H01F 3/12; H01F 38/08; H01F 2027/2819; H01F 17/0006; H01F 17/0013; Y02B 70/10
See application file for complete search history.

(56) References Cited

U.S. PATENT DOCUMENTS

| 5,430,424 A | 7/1995 | Sato et al. |
| 2013/0234819 A1* | 9/2013 | Yoo ............ H01F 17/0013 336/200 |
| 2014/0347159 A1* | 11/2014 | Zuo ............ H01F 27/24 336/84 C |

FOREIGN PATENT DOCUMENTS

| CN | 204316869 U | * | 5/2015 | ......... H01F 17/0013 |
| JP | 2001307933 A | | 11/2001 | |
| JP | 2009289879 A | | 10/2009 | |
| JP | 2018067660 A | | 4/2018 | |
| TW | 201445590 A | | 12/2014 | |
| TW | M520185 U | | 4/2016 | |
| TW | M574747 U | | 2/2019 | |

OTHER PUBLICATIONS

International Search Report and Written Opinion dated Nov. 8, 2022 issued in corresponding International Application No. PCT/US2022/036896.

(Continued)

*Primary Examiner* — Tuyen T Nguyen
(74) *Attorney, Agent, or Firm* — Bachman & LaPointe, P.C.

(57) ABSTRACT

A planar transformer comprising a printed circuit board; a primary planar winding disposed within the printed circuit board; a secondary planar winding disposed within the printed circuit board; a magnetic material disposed within the printed circuit board between the primary planar winding and the secondary planar winding, the magnetic material configured to generate a secondary magnetic flux path; and a magnetic core disposed around and through the printed circuit board and magnetically coupled to the primary planar winding and the secondary planar winding, the magnetic core configured to generate a primary magnetic flux path.

18 Claims, 3 Drawing Sheets

(56) References Cited

OTHER PUBLICATIONS

"A Review of High Frequency Power Converters and Related Technologies", Yijie Wang et al., IEEE Open Journal of the Industrial Electronics Society, IEEE, vol. 1, Sep. 12, 2020, pp. 247-260.
"Investigation on Transformer Design of High Frequency High Efficiency DC-DC Converters", Dianbo Fu et al., Applied Power Electronics Conference and Exposition (APEC), 2010 25th Annual IEEE, Feb. 1, 2010, pp. 940-947.
"Leakage Inductance Calculation for Planar Transformers With a Magnetic Shunt", Jun Zhang et al., IEEE Transactions on Industry Applications, IEEE Service Center, Piscataway, NJ, vol. 50, No. 6, Nov. 1, 2014, pp. 4107-4112.
Office Action issued Aug. 10, 2023 in counterpart Taiwan Appln. No. 111126429 (with English translation).
Japanese Office Action for counterpart JP Application No. 2024-501113 with English translation dated Jan. 7, 2025.
Communication pursuant to Article 94(3) EPC dated Jul. 22, 2025 for counterpart EP application No. 22751552.5.

\* cited by examiner

PRINTED CIRCUIT BOARD INTEGRATED RESONANCE CAPABILITY FOR PLANAR TRANSFORMERS

BACKGROUND

The present disclosure is directed to a planar power transformer having magnetic material laminated directly into printed circuit board windings to provide an alternative flux path and increase leakage inductance.

A planar transformer is essentially a transformer that uses flat windings, usually on a printed circuit board (PCB). The flat windings are utilized instead of wound copper wire to form the coils. The printed circuit board construction creates a form factor that offers some unique advantages and a few tradeoffs.

In power electronics, there is an ever-increasing demand for higher efficiency and power density. Additionally, it is desirable for high-frequency magnetics to be as small as possible and integrated with electronic circuits and devices. As such, planar transformers are being used in an ever-increasing number of industries which used traditional wire wound transformers. Power conversion with resonant switching is used in many applications, from data centers to automotive applications. Examples of an end use for planar transformers include Switch Mode Power Supplies (SMPS) both AC/DC and DC/DC; aerospace, avionics; consumer electronics; industrial power systems; radar power conversion; wide bandgap (WBG) device usage in power electronics; and resonant or quasi-resonant power converters.

However, inherently low leakage inductance in a planar transformer limits the use of zero-volt or resonant switching techniques. Printed circuit board integrated resonance capability enables transistor soft switching for enhanced power system efficiency and size, weight and power improvement.

What is needed is a planar transformer that increases the leakage inductance.

SUMMARY

In accordance with the present disclosure, there is provided a planar transformer comprising: a printed circuit board having a first layer and a second layer proximate the first layer; a first planar winding disposed within the first layer of the printed circuit board; a second planar winding disposed within the second layer of the printed circuit board; a magnetic material disposed within the printed circuit board between the first planar winding and the second planar winding; and a magnetic core disposed over and through the printed circuit board and magnetically coupled to the first planar winding and the second planar winding.

A further embodiment of any of the foregoing embodiments may additionally and/or alternatively include the printed circuit board comprises a window height and the first and second planar windings comprise a winding width; a ratio of the window height to the winding width comprising at least 1:1.

A further embodiment of any of the foregoing embodiments may additionally and/or alternatively include the first planar winding comprises a primary planar winding; and the second planar winding comprises a secondary planar winding.

A further embodiment of any of the foregoing embodiments may additionally and/or alternatively include the first planar winding is substituted for a first wound winding.

A further embodiment of any of the foregoing embodiments may additionally and/or alternatively include the planar transformer further comprising: an additional primary planar winding disposed in the printed circuit board proximate the secondary planar winding opposite the first planar winding; and an additional magnetic material disposed within the printed circuit board between the second planar winding and the additional primary planar winding.

A further embodiment of any of the foregoing embodiments may additionally and/or alternatively include the first planar winding comprises a secondary planar winding; the second planar winding comprises a primary planar winding; the planar transformer further comprising: an additional secondary planar winding disposed in the printed circuit board proximate the primary planar winding opposite the first planar winding; and an additional magnetic material disposed within the printed circuit board between the primary planar winding and the additional secondary planar winding.

A further embodiment of any of the foregoing embodiments may additionally and/or alternatively include the planar transformer of claim 1 is integrated into a converter circuitry for ultra-high density electronics.

In accordance with the present disclosure, there is provided a planar transformer comprising: a printed circuit board; a primary planar winding disposed within the printed circuit board; a secondary planar winding disposed within the printed circuit board; a magnetic material disposed within the printed circuit board between the primary planar winding and the secondary planar winding, the magnetic material configured to generate a secondary magnetic flux path; and a magnetic core disposed around and through the printed circuit board and magnetically coupled to the primary planar winding and the secondary planar winding, the magnetic core configured to generate a primary magnetic flux path.

A further embodiment of any of the foregoing embodiments may additionally and/or alternatively include the secondary magnetic flux path is configured to increase a leakage inductance greater than the leakage inductance from the magnetic core primary magnetic flux path.

A further embodiment of any of the foregoing embodiments may additionally and/or alternatively include the primary planar winding and the secondary planar winding are interleaved.

A further embodiment of any of the foregoing embodiments may additionally and/or alternatively include the planar transformer is integrated into a converter circuitry for ultra-high density electronics.

A further embodiment of any of the foregoing embodiments may additionally and/or alternatively include the planar transformer further comprising: an additional primary planar winding disposed in the printed circuit board proximate the secondary planar winding opposite the primary planar winding; and an additional magnetic material disposed within the printed circuit board between the second planar winding and the additional primary planar winding.

A further embodiment of any of the foregoing embodiments may additionally and/or alternatively include the printed circuit board comprises a window height and the first and second planar windings comprise a winding width; a ratio of the window height to the winding width comprising at least 1:1.

In accordance with the present disclosure, there is provided a process to increase a leakage inductance in a planar transformer comprising: a printed circuit board; disposing a primary planar winding within the printed circuit board; disposing a secondary planar winding within the printed circuit board proximate the primary planar winding; disposing a magnetic material within the printed circuit board between the primary planar winding and the secondary planar winding; generating a secondary magnetic flux path with the magnetic material; disposing a magnetic core around and through the printed circuit board; magnetically coupling the magnetic core to the primary planar winding and the secondary planar winding; generating a primary magnetic flux path with the magnetic core; and increasing the leakage inductance in the planar transformer.

A further embodiment of any of the foregoing embodiments may additionally and/or alternatively include the process further comprising: disposing an additional primary planar winding in the printed circuit board proximate the secondary planar winding opposite the primary planar winding; and disposing an additional magnetic material within the printed circuit board between the second planar winding and the additional primary planar winding.

A further embodiment of any of the foregoing embodiments may additionally and/or alternatively include the step of increasing the leakage inductance comprises the combination of the secondary magnetic flux path with the magnetic core primary magnetic flux path.

A further embodiment of any of the foregoing embodiments may additionally and/or alternatively include the process further comprising: integrating the planar transformer into a converter circuitry for ultra-high density electronics.

A further embodiment of any of the foregoing embodiments may additionally and/or alternatively include the process further comprising: interleaving the primary planar winding and the secondary planar winding.

Other details of the planar transformer are set forth in the following detailed description and the accompanying drawings wherein like reference numerals depict like elements.

DETAILED DESCRIPTION

Figure 1:
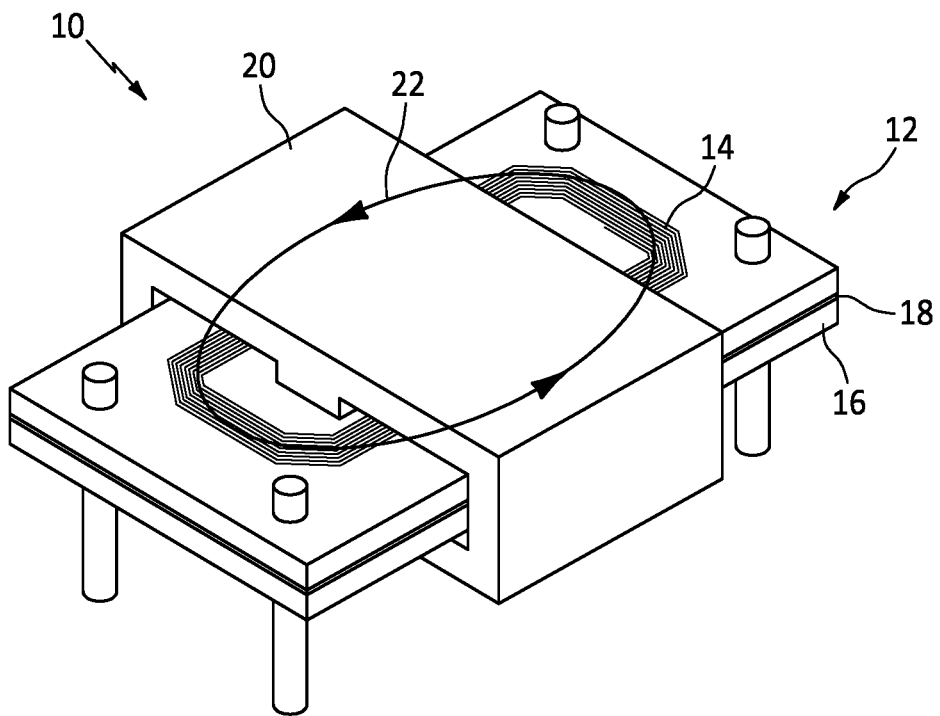
FIG. 1 is an isometric view of an exemplary planar transformer.
Figure 2:
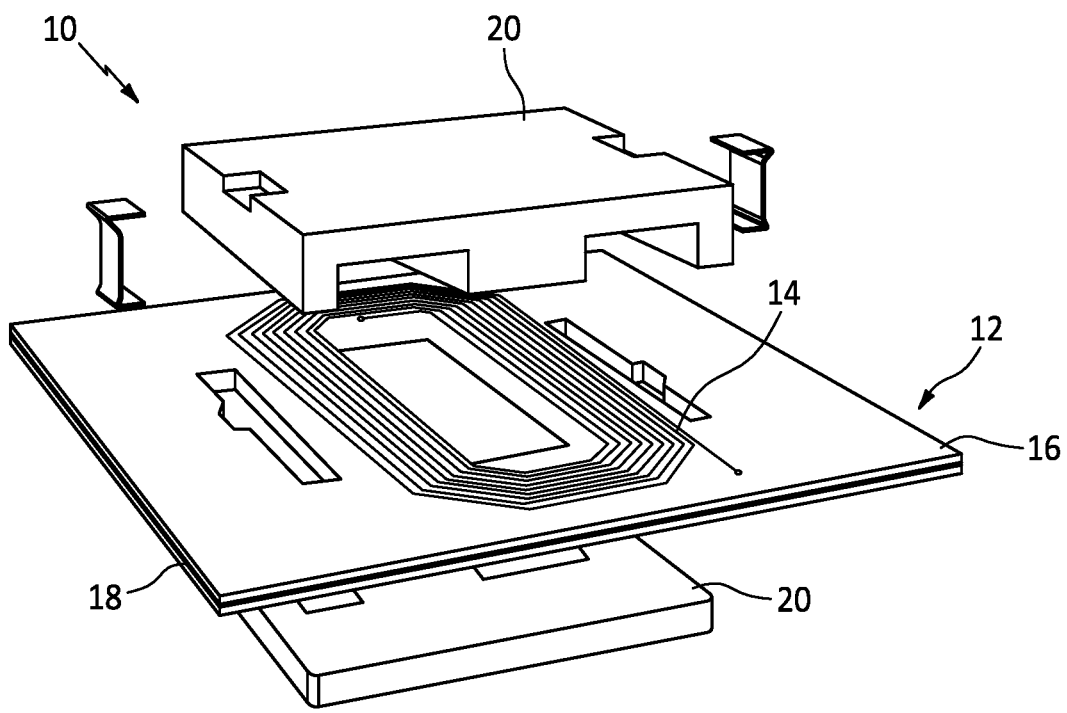
FIG. 2 is an exploded view of the exemplary planar transformer.

Referring now to FIGS. 1 and 2, there is illustrated a planar transformer 10. The planar transformer 10 includes a printed circuit board 12. The printed circuit board 12 includes a planar winding 14. The planar winding 14 can be formed from a thin copper sheet or etch spiral patterns as shown in FIG. 2. The printed circuit board 12 includes layers 16 laminated into the circuit board 12. A magnetic material 18 is laminated between the layers 16 of the printed circuit board 12. The magnetic material 18 can be unitary, integral with the printed circuit board 12 material. The magnetic material 18 can be interspersed throughout material of the printed circuit board 12. The magnetic material 18 can include magnetic thermoplastic laminate materials, such as a low loss, high resistivity ceramic filler thermoplastic matrix material. An example of such a magnetic material 18 can include MAGTREX 555™. A magnetic core 20 is disposed over and through the printed circuit board 12 proximate the planar winding 14, such that the magnetic core 20 is magnetically coupled to primary planar winding 28 and said secondary planar winding 32.

Figure 3:
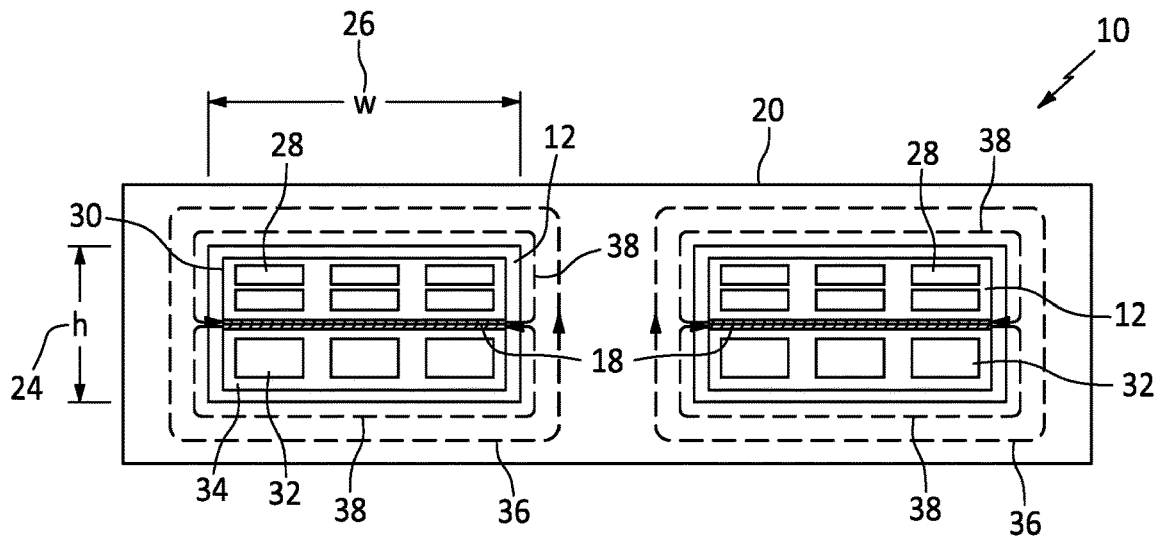
FIG. 3 is a cross-sectional view of the exemplary planar transformer.

As seen in FIG. 1, a mean length of a winding turn 22 is shown as a schematic representation in relation to leakage inductance ($L_{lk}$). Referring also to FIG. 3, the cross sectional view of the planar transformer 10 is shown. The leakage inductance is directly related to a window height 24 and inversely related to a width 26 of the printed circuit board 12. This relationship can be expressed as $L_{lk} \alpha lh/w$; with $L_{lk}$=leakage inductance, l=mean length of a winding turn, h=window height, w=winding width. The planar magnetic core 20 used with a short window height 24, wide winding width 26 with the printed circuit board 12, can reduce leakage inductance. An exemplary ratio of core winding width 26 to window height 24 can include 1:1 or higher; in particular a ratio of 2:1 or even 3:1 can provide technical advantages.

FIG. 3 shows the printed circuit board 12 having a primary winding 28 proximate a first layer 30 opposite a secondary winding 32 proximate a second layer 34. The magnetic material 18 is disposed between the primary winding 28 and the secondary winding 32 within the material of the printed circuit board 12.

Performance of the printed circuit board 12 can depend on relative permeance of the printed circuit board 12 integrated magnetic material 18 vs that of the bulk magnetic core 20, where $P \propto \mu A$, $\mu$ is magnetic permeability and A is the cross sectional area of magnetic material normal to the path of magnetic flux. Flux will follow the higher permeance path. Permeance of the leakage path(s) should therefore be much lower than that of the bulk core, without being so low that the permeance has no effective impact on magnetic performance. For the exemplary embodiment shown in FIG. 3, a reasonable permeance range can be $P_{core} > 5\times$ to $100 \times P_{lk}$. However, effective permeance including winding and core shape effects is difficult to determine analytically and methods such as finite element analysis or prototyping are typically used to directly assess leakage inductance.

The magnetic core 20 that surrounds the printed circuit board 12 provides a primary magnetic flux path 36 as shown in FIG. 3. With the introduction of the magnetic material 18 between the primary winding 28 and secondary winding 32 additional/secondary magnetic flux paths 38 are created by the magnetic material 18 within the printed circuit board 12. The additional/secondary magnetic flux paths 38 act to increase leakage inductance. The resulting leakage has a low electro-magnetic interference (EMI) and is internal to the magnetic core 20. The additional magnetic flux paths 38 also help to avoid detrimental coupling to additional structures, such as baseplates, enclosures or nearby electronics (not shown).

Figure 4:
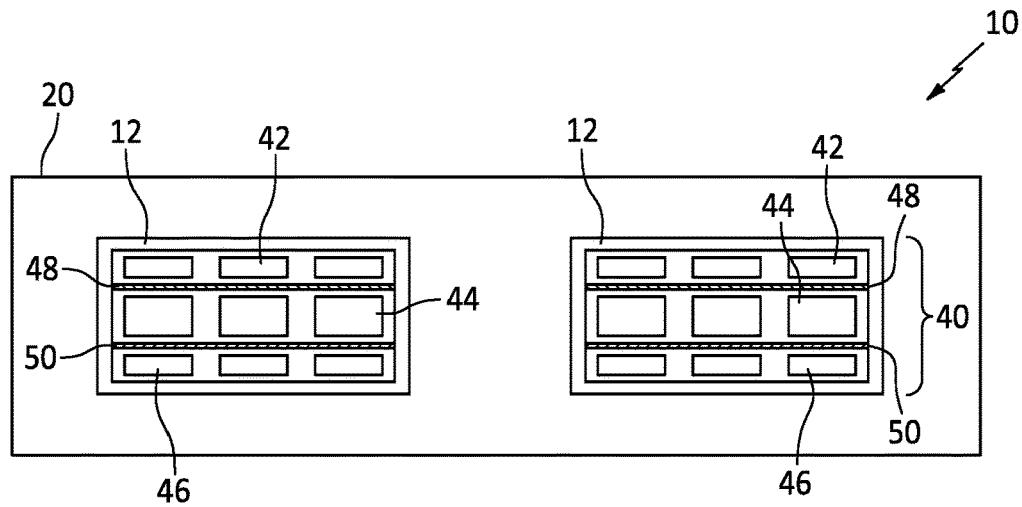
FIG. 4 is a cross-sectional view of an alternative exemplary planar transformer.

Referring also to FIG. 4 an exemplary embodiment of the planar transformer 10 is shown. The printed circuit board 12 can include an arrangement of interleaved/alternating planar windings 40. As shown in FIG. 4. a first primary winding 42 can be set adjacent a secondary winding 44 with a second primary winding 46 opposite the first primary winding 42, as shown. A first layer of magnetic material 48 can be disposed between the first primary winding 43 and the secondary winding 44. A second layer of magnetic material 50 can be disposed between the secondary winding 44 and the second primary winding 46.

Figure 5:
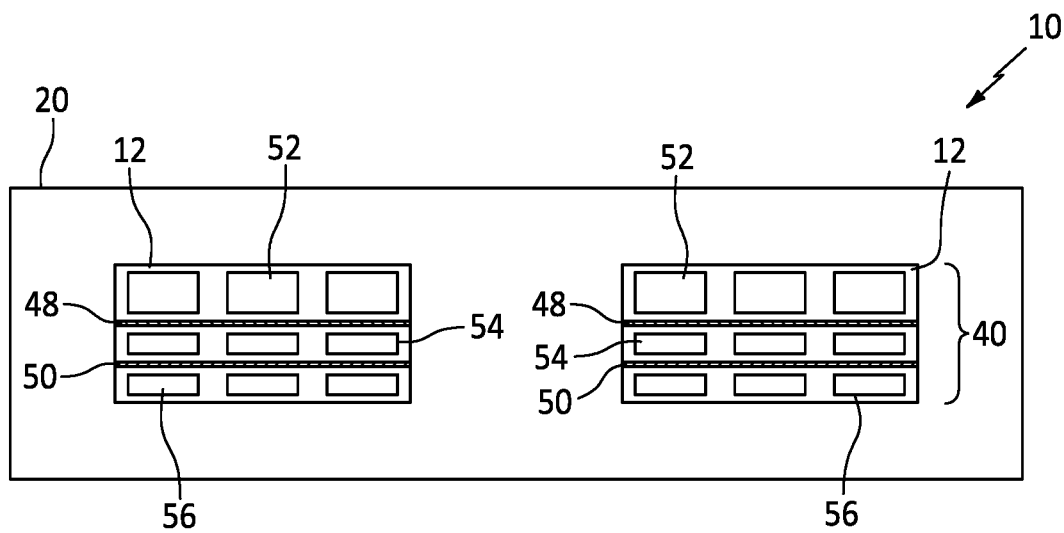
FIG. 5 is a cross-sectional view of an alternative exemplary planar transformer.

Referring also to FIG. 5 and exemplary embodiment of the planar transformer 10 is shown. The printed circuit board 12 can include an arrangement of interleaved/alternating planar windings 40. As shown in FIG. 5, a first secondary winding 52 can be set adjacent a primary winding 54 with a second secondary winding 56 opposite the first secondary winding 52, as shown. A first layer of magnetic material 48 can be disposed between the first secondary winding 52 and the primary winding 54. A second layer of magnetic material 50 can be disposed between the primary winding 54 and the second secondary winding 56. The interleaved arrangement 40 can provide a reduction in winding losses due to high frequency induced effects, and provide improved coupling between windings.

Figure 6:
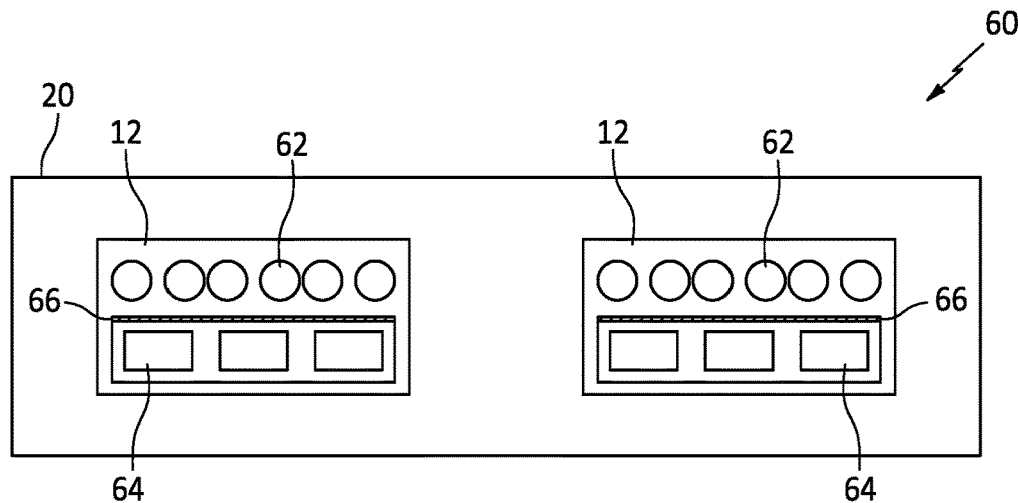
FIG. 6 is a cross-sectional view of an alternative exemplary planar transformer.

Referring also to FIG. 6 an exemplary embodiment is shown with a hybrid planar transformer 60. The hybrid planar transformer 60 includes a printed circuit board 12 with an arrangement of a primary winding 62 configured as a wound winding and a secondary winding 64 configured as a planar winding. The magnetic material layer 66 can be between the primary winding 62 and the secondary winding 64. In another hybrid planar transformer 60 embodiment (not shown), the primary winding 62 can be a planar winding and the secondary winding 64 can be a wound winding with the magnetic material layer 66 in between the primary winding 62 and the secondary winding 64. Another alternative embodiment, can include a multi-tap planar transformer or a multi-secondary planar transformer (not shown).

Figure 7:
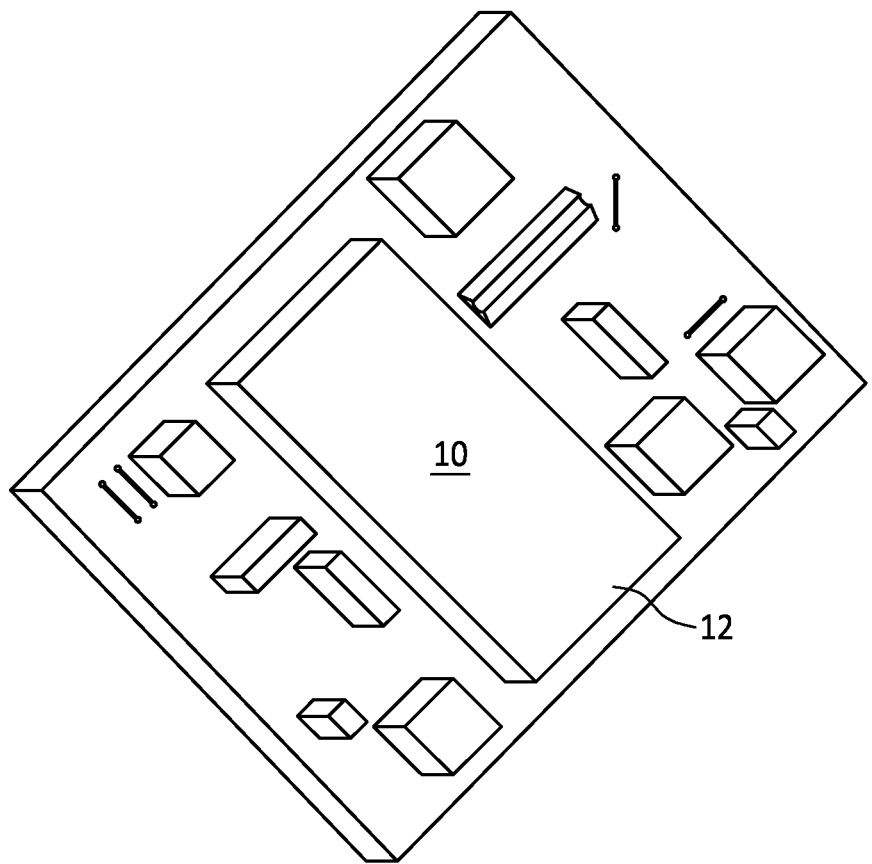
FIG. 7 is an isometric view of an alternative exemplary planar transformer integrated into converter circuitry for ultra-high density electronics.

In an alternative embodiment, the planar transformer 10 disclosed with the magnetic material 18 laminated unitary with the printed circuit board 12 between the windings 28 and 32 includes integration of the planar transformer 10 into converter circuitry for ultra-high density electronics as shown in FIG. 7. For example, the exemplary planar transformer 10 can be integrated into a converter such that the planar transformer is integrated with the additional converter circuitry.

A technical advantage of the disclosed planar transformer includes the use of magnetic materials that can be embedded in a circuit board since the low permeability is exploited in the magnetic structure of the disclosure to enable usage of the material at lower frequencies.

Another technical advantage of the disclosed planar transformer includes the capacity to utilize magnetic materials that can be embedded in a circuit board at a frequency of less than 1 MHz.

Another technical advantage of the disclosed planar transformer includes a ratio of permeability of the laminated magnetic material to the bulk magnetic core to be less than or equal to 0.25.

Another technical advantage of the disclosed planar transformer includes a percentage increase in leakage inductance of around 10 times the planar transformer without the magnetic material laminate in the printed circuit board between windings.

There has been provided a planar transformer. While the planar transformer has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A planar transformer comprising:
   a printed circuit board having a first layer and a second layer proximate the first layer;
   a first planar winding disposed within said first layer of the printed circuit board;
   a second planar winding disposed within said second layer of the printed circuit board;
   a magnetic material disposed unitary and integral within said printed circuit board material, wherein the magnetic material comprises magnetic thermoplastic laminate material; and
   a magnetic core disposed over and through the printed circuit board and magnetically coupled to the first planar winding and the second planar winding.

2. The planar transformer according to claim 1, wherein said printed circuit board comprises a window height and said first and second planar windings comprise a winding width; a ratio of said window height to said winding width comprising at least 1:1.

3. The planar transformer according to claim 1, wherein said first planar winding comprises a primary planar winding; and said second planar winding comprises a secondary planar winding.

4. The planar transformer according to claim 3, wherein said first planar winding is substituted for a first wound winding.

5. The planar transformer according to claim 3, further comprising:
   an additional primary planar winding disposed in said printed circuit board proximate said secondary planar winding opposite said first planar winding; and
   an additional magnetic material disposed within said printed circuit board between said second planar winding and said additional primary planar winding.

6. The planar transformer according to claim 1, wherein said first planar winding comprises a secondary planar winding; said second planar winding comprises a primary planar winding; said planar transformer further comprising:
   an additional secondary planar winding disposed in said printed circuit board proximate said primary planar winding opposite said first planar winding; and
   an additional magnetic material disposed within said printed circuit board between said primary planar winding and said additional secondary planar winding.

7. The planar transformer according to claim 1, wherein said planar transformer of claim 1 is integrated into a converter circuitry for ultra-high density electronics.

8. A planar transformer comprising:
   a printed circuit board;
   a primary planar winding disposed within said printed circuit board;
   a secondary planar winding disposed within said printed circuit board;
   a magnetic material disposed within interspersed throughout material of said printed circuit board, wherein the magnetic material comprises a low loss, high resistivity ceramic filler thermoplastic matrix material, said magnetic material configured to generate a secondary magnetic flux path; and
   a magnetic core disposed around and through the printed circuit board and magnetically coupled to the primary planar winding and the secondary planar winding, said magnetic core configured to generate a primary magnetic flux path.

9. The planar transformer according to claim 8, wherein said secondary magnetic flux path is configured to increase a leakage inductance greater than the leakage inductance from said magnetic core primary magnetic flux path.

10. The planar transformer according to claim 9, wherein said primary planar winding and said secondary planar winding are interleaved.

11. The planar transformer according to claim 9, wherein said planar transformer of claim 8 is integrated into a converter circuitry for ultra-high density electronics.

12. The planar transformer according to claim 8, further comprising:
   an additional primary planar winding disposed in said printed circuit board proximate said secondary planar winding opposite said primary planar winding; and
   an additional magnetic material disposed within said printed circuit board between said second planar winding and said additional primary planar winding.

13. The planar transformer according to claim 8, wherein said printed circuit board comprises a window height and said first and second planar windings comprise a winding width; a ratio of said window height to said winding width comprising at least 1:1.

14. A process to increase a leakage inductance in a planar transformer comprising:
   a printed circuit board;
   disposing a primary planar winding within said printed circuit board;
   disposing a secondary planar winding within said printed circuit board proximate said primary planar winding;
   disposing a magnetic material within said printed circuit board between said primary planar winding and said secondary planar winding;
   generating a secondary magnetic flux path with said magnetic material;
   disposing a magnetic core around and through the printed circuit board;
   magnetically coupling said magnetic core to the primary planar winding and the secondary planar winding;
   generating a primary magnetic flux path with said magnetic core; and
   increasing the leakage inductance in the planar transformer.

15. The process of claim 14, further comprising:
   disposing an additional primary planar winding in said printed circuit board proximate said secondary planar winding opposite said primary planar winding; and
   disposing an additional magnetic material within said printed circuit board between said second planar winding and said additional primary planar winding.

16. The process of claim 14, wherein the step of increasing the leakage inductance comprises the combination of said secondary magnetic flux path with said magnetic core primary magnetic flux path.

17. The process of claim 14, further comprising:
   integrating said planar transformer of claim 14 into a converter circuitry for ultra-high density electronics.

18. The process of claim 14, further comprising:
   interleaving said primary planar winding and said secondary planar winding.

* * * * *